Patented Nov. 28, 1944

2,363,506

UNITED STATES PATENT OFFICE 2,363,506

PROCESS FOR BREAKING PETROLEUM EMULSIONS

Melvin De Groote, University City, Bernhard Keiser, Webster Groves, and Arthur F. Wirtel, Kirkwood, Mo., assignors to Petrolite Corporation, Ltd., Wilmington, Del., a corporation of Delaware No Drawing. Application October 26, 1942, Serial No. 463,440

6 Claims. (Cl. 252—340)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned, is of significant value in removing impurities, particularly inorganic salts, from pipeline oil.

Briefly described, our process consists in subjecting a petroleum emulsion of the water-in-oil type to the action of a demulsifier obtained by reaction between a polybasic carboxy acid, and particularly a dibasic carboxy acid or its anhydride, and certain oxyacylated derivatives of ricinoleic acid, or more especially, derivatives of the commonest ricinoleic acid ester, to wit, triricinolein or castor oil.

Reference is made to our three applications Serial Nos. 440,749, 440,750, and 440,751, filed April 27, 1942, now U. S. Patents Nos. 2,340,305, 2,340,306 and 2,340,307, all dated February 1, 1944.

Our first mentioned co-pending application describes a drastically-oxidized hydroxyacetylated ricinoleic acid compound selected from the class consisting of castor oil, triricinolein, diricinolein, monoricinolein, superglycerinated castor oil, castor oil estolides, polyricinoleic acid, and ricinoleic acid.

The second aforementioned co-pending application describes a hydroxyacetylated, drastically-oxidized, ricinoleic acid compound selected from the class consisting of blown castor oil, blown triricinolein, blown diricinolein, blown monoricinolein, blown superglycerinated castor oil, blown polyricinoleic acid, and blown castor oil estolides.

The last aforementioned co-pending application describes a hydroxyacetylated, drastically-oxidized, dehydrated ricinoleic acid compound selected from the class consisting of drastically-oxidized, dehydrated castor oil; drastically-oxidized, dehydrated triricinolein; drastically-oxidized, dehydrated diricinolein; drastically-oxidized, dehydrated monoricinolein; drastically-oxidized, dehydrated ricinoleic acid; drastically-oxidized, dehydrated polyricinoleic acid; and the estolides of drastically-oxidized, dehydrated castor oil.

In the present instance, materials of the kind described in said aforementioned co-pending applications are employed as intermediates for the manufacture of more complex compounds or mixtures of compounds. In other words, the oxyacetylated ricinoleic acid derivatives of the kind previously described are treated with polybasic carboxy acids, such as oxalic acid, citric acid, tartaric acid, succinic acid, adipic acid, maleic acid, fumaric acid, citraconic acid, phthalic acid, or the functional equivalents of such acids as, for example, the anhydrides, to form products of particular value when used as demulsifiers for oil field emulsions. We particularly prefer to use diabasic acids, and especially such dibasic acid or anhydrides which have 8 carbon atoms or less.

As far as we are aware, the raw materials used as reactants in the present instance for chemical combination with polybasic carboxy acids are described only in the aforementioned co-pending applications.

For completeness of description, it appears necessary to refer to such co-pending applications; and what is said hereinafter is taken in substantially verbatim form from said co-pending applications.

PREPARATION OF RAW MATERIAL, TYPE 1

*Drastically-oxidized, hydroxyacetylated ricinoleic acid compounds*

It is well known that oxidized oils can be obtained from castor oil, ricinoleic acid and various derivatives of ricinoleic acid, such as monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.; or it may be of the organic type which produces peroxide, such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8-10 hours, or it may be quite extensive, for instance, as long as 10-12-14 days, the longer time periods being employed generally when the temperature is just slightly above the boiling point of water, and when oxidation is with air at atmospheric pressure.

One method of preparing drastically-oxidized castor oil is described in U. S. Patent No. 2,023,979, dated December 10, 1935, to Stehr. Also see U. S. Patent No. 2,183,487, dated December 12, 1939, to Colbeth.

Thus, the same conventional procedure or procedures employed for oxidation of castor oil or similar compounds is equally suitable for the blowing or oxidation of hydroxyacetylated triricinolein. In most instances, the period of oxidation may be somewhat longer, although it is also possible to obtain satisfactory products, in which the period of oxidation is somewhat reduced in comparison with the oxidation of castor oil or triricinolein under the same conditions. The application of oxidation is so similar to or identical with that of castor oil, that any differences of manipulation which may be required are perfectly apparent in the ordinary conduct of the process. For instance, if one attempts to oxidize hydroxyacetylated castor oil to obtain the same viscosity as an oxidized castor oil, and if at the end of the predetermined period, the viscosity or other index indicates under-oxidation, naturally, the process is continued until the same or a comparable degree of oxidation is obtained. Similarly, in the conventional blowing of castor oil, the last stage of oxidation is somewhat critical and sometimes the period of blowing must be shortened. If, during the oxidation of hydroxyacetylated castor oil, there happens to be an increased or intensive period of reaction, obviously only the ordinary precautions need be taken to prevent over-oxidation. Except for the difference in molecular weight, hydroxyacetylated castor oil presents the same degree of unsaturation as castor oil, and thus the degree of oxidation can be measured, or at least approximated, by the percentage reduction in iodine value, simultaneously with the increase in viscosity.

The production of hydroxyacetylated castor oil is comparatively simple and is comparable to the manufacture of acetylated castor oil, except that hydroxyacetic acid appears to be more reactive than acetic acid, for instance any suitably selected amount of castor oil may be treated with the appropriate amount of hydroxyacetic acid under conditions to promote esterification and remove any water formed. The usual procedures for promotion of esterification are well known, and involve one or more of the following: Employment of a temperature high enough to eliminate any water formed, for instance, 120-180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor and solvent vapor is separated by gravity; and the solvent returned to the reacting chamber for further use.

The selection of suitable amounts of reactants in the manufacture of hydroxyacetylated castor oil is, of course, simple. Castor oil may be analyzed for its triricinolein content by determination of its hydroxyl or acetyl value. Such determination, of course, includes any hydroxy acid compounds other than ricinoleic acid present, but this is immaterial for the present purpose. On the average, castor oil will indicate 85-92% of triricinolein. For convenience, in the present instance, one may consider triricinolein as if it were a trihydric alcohol, and thus, one may obtain mono-hydroxyacetylated triricinolein, di-hydroxyacetylated triricinolein, and tri-hydroxyacetylated triricinolein. For practical purposes, of course, there is no economical justification for trying to obtain a technically pure triricinolein and subjecting such material to hydroxyacetylation instead of employing castor oil.

Thus, the product particularly contemplated as a reactant in the present instance, is the compound or compounds obtained by the hydroxyacetylation of castor oil. For purposes of convenience, reference will be made to mono-hydroxyacetylated castor oil, di-hydroxyacetylated castor oil, and tri-hydroxyacetylated castor oil. Examination of the reaction between hydroxyacetic acid and castor oil indicates that water is formed and must be removed. Actually, the water formed may not necessarily be removed instantly, and thus may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reaction with the castor oil, and thus, the product or composition which is actually acetylated may even contain glycerol, in addition to triricinolein. It is not intended, in the present instance, to claim the product obtained by oxidation of hydroxyacetylated glycerol, but it is to be noted that such material may be present cogenerically, for reasons indicated. Earlier reference to the compounds herein contemplated, and particularly for use as a reactant, include the hydroxyacetylated derivatives of ricinoleic acid compounds. These are now suitably qualified to be limited to triricinolein, diricinolein, monoricinolein, and ricinoleic acid, and most particularly, the cogeneric mixture obtained by the hydroxyacetylation of castor oil, including specific members mentioned subsequently.

Although it is believed that, in view of what has been said, no further description is necessary in regard to the manufacture of hydroxyacetylated castor oil, the following examples are included by way of illustration:

HYDROXYACETYLATED CASTOR OIL

*Example 1*

1,000 pounds of castor oil (triricinolein content 88%) is treated with 111 pounds of concentrated hydroxyacetic acid containing 30% of water. The reaction is conducted at 110-180 degrees centigrade for approximately 6 hours. Completeness of reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxy-acetylated castor oil.

HYDROXYACETYLATED CASTOR OIL

Example 2

The same procedure is employed as in Example 1, preceding, except that twice the amount of hydroxyacetic acid is employed so as to obtain a di-hydroxyacetylated castor oil.

HYDROXYACETYLATED CASTOR OIL

Example 3

The same procedure is followed as in Example 1, preceding, except that three times the amount of hydroxyacetylated castor oil is employed so as to yield a substantially tri-hydroxyacetylated castor oil.

HYDROXYACETYLATED CASTOR OIL

Example 4

The same procedure is followed as in Examples 1 to 3, preceding, except that anhydrous hydroxyacetic acid is employed and water is removed immediately upon formation. The product so obtained represents hydroxyacetylated castor oil, or more especially, hydroxyacetylated triricinolein, in the presence of a minimum amount of hydroxyacetylated cogeners.

It is well known that the exact composition of ordinary oxidized castor oil is not known. This has been a matter of comment from time to time in the literature, including the patent literature dealing with arts in which blown castor oil is contemplated. However, it is obvious that the nature of the products obtained by oxidation of hydroxyacetylated triricinolein or castor oil, must be significantly different from those obtained by the oxidation of castor oil. There are a number of reasons for this statement. One reason is the fact that oxidation, in both instances, involves the alcoholic hydroxyl radical. In the case of castor oil or triricinolein all three alcoholic radicals present are secondary alcoholic radicals. In the case of hydroxyacetylated castor oil, at least one of the three alcoholic radicals present are primary alcoholic radicals, and all three may be primary alcoholic radicals. It is one of the fundamental principles of organic chemistry that the oxidation of primary alcohols yields different products than are obtained by the oxidation of secondary alcohols. In view of this single concept alone, it is obvious that oxidized hydroxyacetylated triricinolein or castor oil must be of a different nature than ordinary oxidized castor oil.

In examining the chemical structure of hydroxyacetic acid, it is instantly recognized that the hydroxyl radical present has replaced an alpha-hydrogen atom, and thus, in the light of the theory of electronegativity, must be particularly susceptible to reaction. This points to a reactiveness on the part of this particular radical which would not necessarily be enjoyed by any primary alcoholic radical.

Then too, previous reference has been made to the fact that one need not employ anhydrous hydroxyacetic acid, but one may employ a concentrated aqueous solution of the kind available commercially. Thus, water enters as a reactant, even though not necessarily so selected. Hence, ultimately one may be concerned with the oxidation of the cogeneric mixture previously described in detail. Incidentally, in such cogeneric mixture, not only may ricinoleic acid be present, as has been pointed out, but one may also have a polyricinoleic acid, such as diricinoleic acid, triricinoleic acid, etc. Such polyricinoleic acids are included within the scope of the expression "ricinoleic acid compound" previously employed.

DRASTICALLY-OXIDIZED, HYDROXYACETYLATED CASTOR OIL

Example 1

1,000 pounds of a material of the kind described under the heading "Hydroxyacetylated castor oil, Example 1," preceding, is subjected to oxidation in the same conventional manner as employed for castor oil. The temperature employed is 120° C., and the time approximately 223 hours. At the end of a period of oxidation, the product shows a marked increase in viscosity. The usual analytical determinations such as are conventionally employed in connection with the examination of blown castor oil, indicate that drastic oxidation has taken place. The values, so determined, may be conveniently compared with the similar values determined on the hydroxyacetylated castor oil prior to oxidation.

DRASTICALLY-OXIDIZED, HYDROXYACETYLATED CASTOR OIL

Example 2

The same procedure is followed as in Example 1, preceding, except that one employs as an intermediate material for oxidation the particular hydroxyacetylated castor oil described under the heading "Hydroxyacetylated castor oil, Example 2," preceding.

DRASTICALLY-OXIDIZED, HYDROXYACETYLATED CASTOR OIL

Example 3

The same procedure is followed as in Example 1, preceding, except that one employs as an intermediate material for oxidation the particular hydroxyacetylated castor oil described under the heading "Hydroxyacetylated castor oil, Example 3," preceding.

DRASTICALLY-OXIDIZED, HYDROXYACETYLATED CASTOR OIL

Example 4

The same procedure is followed as in Example 1, preceding, except that one employs as an intermediate material for oxidation the particular hydroxyacetylated castor oil described under the heading "Hydroxyacetylated castor oil, Example 4," preceding.

Nothing that has been said previously is intended to suggest that one may not use chemically pure or technically pure triricinolein as a reactant instead of castor oil. It may be used, if desired. Furthermore, one may obtain or prepare diricinolein, either pure or of a technical grade, and such product may be converted into the mono- or poly-hydroxyacetylated derivative. The same applies to monoricinolein. Mono-hydroxyacetylated ricinoleic acid may also be employed. For obvious reasons, however, nothing is ordinarily gained by using any raw material other than castor oil, and we have found castor oil to yield much more effective demulsifiers than the other materials referred to. Thus, our preference, by far, is to employ castor oil as a reactant.

In view of what has been said, it is obvious that in the hereto appended claims there cannot be any satisfactory means of characterizing the products, as such, or for use as demulsifiers, except in terminology, which is related to the method of manufacture.

The expression "drastically-oxidized," or "drastic oxidation," as employed in the hereto appended claims, refers to gaseous oxidation by means of an oxygen-containing medium. Such expression does not contemplate wet oxidation, or oxidation by means of permangenate, or other comparable oxidizing agents.

It is furthermore understood that hydroxyacetylation can be conducted by means of the chemical equivalent of hydroxyacetic acid, as well as the acid itself, for example, the anhydride or acylchloride.

PREPARATION OF RAW MATERIAL, TYPE 2

*Hydroxyacetylated, drastically-oxidized ricinoleic acid compounds*

Mild oxidation, i. e., oxidation as exemplified by the exposure of a film of castor oil to air, for an extended period of time, such as weeks, or even months (see Chemical Technology and Analysis of Oils, Fats, and Waxes, by Lewkowitsch, sixth edition, volume 2, page 406), produces relatively small modifications of certain important indices, such as the iodine value, the acetyl value, and the saponification value. If drastic oxidation takes place, either by continued mild oxidation or by more vigorous oxidation from the very beginning of the reaction, as induced by either a higher reaction temperature, or the presence of a catalyst, then there is obtained an oxidized oil having characteristics which clearly indicate that drastic oxidation has taken place. These indices of drastic oxidation are a relatively low iodine value, such as 70 or less, and may be as low as 40, or thereabouts; a saponification value of 215 to 283, or thereabouts; an acetyl value of approximately 160–200; an increased viscosity such that the material may be hardly mobile at ordinary temperatures; a specific gravity of almost one, or a trifle over one at times; an increased refractive index; and, in the absence of other coloring matter, a yellow to deep orange color. The color at times may be a questionable index, since some oxidized castor oils are bleached to make them particularly adaptable for use as plasticizers in light colored resinoid bodies.

Drastically-oxidized castor oil can be prepared by well known methods, or such products can be purchased in the open market under various trade names, such as "blown castor oil," "blended castor oil," "blended bodied castor oil," "processed castor oil," "oxidized castor oil," "heavy castor oil," "viscous castor oil," etc. These various trade names appear to be applied to drastically-oxidized castor oils which differ merely in degree but not in kind.

The color of these oils is still pale or light colored in comparison with the oil from which they have been derived. Usually they are fairly transparent, particularly in reasonably thin layers, for instance, an inch or less. Such oils represent greater or lesser degrees of partial oxidation in the sense that there is a drastic change in comparison with the change that takes place when a film of castor oil is exposed to air.

For the sake of differentiation, oils of the kind previously described will be referred to as pale blown, drastically-oxidized castor oils; and the same terminology is intended to apply to all other ricinoleic bodies of the kind hereinafter described. In addition to pale blown, drastically-oxidized castor oil, there is also another type of the kind described in U. S. Patent No. 2,023,979, to Stehr, dated December 10, 1935. The product described in said Stehr patent is characterized by the fact that drastic oxidation is continued past the stage where a pale blown oil is obtained, and where, as a matter of fact, a super oxidized product of almost semi-livery consistency is obtained.

Such products are usually much darker in color than the pale blown castor oils, for the reason that certain side reactions occur with the formation of dark colored by-products; and as a result, the transparency of the oil has greatly decreased or disappeared, and it is apt to be opaque in nature.

Attention is directed particularly to U. S. Patent No. 2,183,487, dated December 12, 1939, to Colbeth, to the extent that it discloses details as to the oxidation of castor oil in a manner that is particularly desirable.

Our preference is to subject a pale blown castor oil of the following characteristics, to hydroxyacetylation:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent $SO_3$ | 0.0 |
| Percent ash | Trace |

The production of hydroxyacetylated blown castor oil or similar compounds is comparatively simple and is comparable to the manufacture of acetylated castor oil, except that hydroxyacetic acid or its equivalent, such as the anhydride or acyl chloride, is employed, and castor oil is replaced by the blown product. In view of the acetyl or hydroxyl value of blown castor oil, the principal reaction is obviously an esterification reaction in which the reaction is hastened or caused to go to completion by removal of any water formed. The usual procedures for promotion of esterification are well known, and involve one or more of the following: Employment of a temperature high enough to eliminate any water formed, for instance, 120–180° C.; sometimes the presence of a strong acid, such as a benzenesulfonic acid in small amounts acts as a catalyst; sometimes it is expedient to pass an inert dried gas through the reaction mixture; at other times esterification may be conducted in the presence of a high boiling water-insoluble solvent, such as xylene or the like, which assists in removing the water in the form of vapors; the condensate so derived, both from the water vapor and the solvent vapor, is separated by gravity; and the solvent returned to the reacting chamber for further use.

The selection of suitable amounts of reactants in the manufacture of hydroxyacetylated blown castor oil is, of course, simple. The blown oil may be analyzed so as to determine its hydroxyl or acetyl value. Such value may be interpreted on the basis of each fatty acid radical present. The acetyl value or hydroxyl value may not correspond exactly to the alcoholic hydroxyl radicals attached to each high molal fatty acid acyl radical, but such value does correspond, at least approximately. The reason is that there may be present anhydrides, or possibly, some compounds of unknown nature or stability, which affect the hydroxyl value determination. For convenience in the present instance, one may consider blown triricinolein in the same manner that it is sometimes convenient to consider triricinolein, i. e., as if it were a trihydric alcohol, and thus, one may obtain mono-hydroxyacetylated, blown triricinolein, dihydroxyacetylated, blown triricinolein, and tri-hydroxyacetylated, blown triricinolein. For practical purposes, of course, there is no economical justification for obtaining a technically pure blown triricinolein and subjecting such material to hydroxyacetylation instead of employing blown castor oil.

Thus, the product particularly contemplated in the present instance is the compound or compounds obtained by the hydroxyacetylation of blown castor oil. For purposes of convenience, reference will be made to mono-hydroxyacetylated, blown castor oil, di-hydroxyacetylated, blown castor oil, and tri-hydroxyacetylated, blown castor oil. Examination of the reaction between hydroxyacetic acid and castor oil, or hydroxyacetic acid and blown castor oil, indicates that water is formed and must be removed. Actually, the water formed may not necessarily be removed instantly, and thus, the water may undergo certain obvious reactions. Likewise, for reasons of economy, it may be desirable to use a highly concentrated hydroxyacetic acid instead of the anhydrous material as the selected reactant. In such instances, the water would readily enter into hydrolytic reactions with the blown castor oil, and thus, the product or composition which is actually hydroxyacetylated, may include compounds comparable to ricinoleic acid, polyricinoleic acid, monoricinolein and diricinolein. Generically, the expression "superglycerinated fats," or "superglycerinated triricinolein" refers to the mixture in which the mono-glycerides and diglycerides are present. Specific terminology indicated in the present instance would be superglycerinated blown castor oil. Likewise, the acids and polymerized acids obtained from the blown castor oil, are sometimes referred to as a "blown castor oil estolide." (See U. S. Patent No. 2,079,762, dated May 11, 1937, to De Groote and Keiser.) In addition to the other products formed by hydrolysis, glycerol must be included. It is not intended in the present instance to claim the product obtained by hydroxyacetylation of glycerol, but it is to be noted that such material may be present cogenerically, for reasons indicated. Earlier references to the compounds herein contemplated, and particularly for use as a demulsifier, include hydroxyacetylated derivatives of blown ricinoleic acid compounds, and such expression is now suitably qualified so as to be limited to blown castor oil, blown triricinolein, blown superglycerinated castor oil, and blown castor oil estolides, and other specific compounds mentioned subsequently. The preferred example is the cogeneric mixture obtained by the hydroxyacetylation of blown castor oil. One may employ superglycerinated blown castor oil obtained by reaction between blown castor oil and glycerine, in the proportion of one or two moles of glycerol per mole of blown castor oil. This simply means that the product is obtained by rearrangement instead of hydrolysis. Obviously, one may also employ technically pure blown monoricinolein, technically pure blown diricinolein, and technically pure blown ricinoleic acid.

Although it is believed, in view of what has been said, that no further description is necessary in regard to the manufacture of hydroxyacetylated blown ricinoleic acid compounds, the following examples are included by way of illustration:

HYDROXYACETYLATED, BLOWN CASTOR OIL

Example 1

1,000 pounds of pale blown castor oil corresponding to the tabular specification above is treated with 111 pounds of concentrated hydroxyacetic acid containing 30% of water. The reaction is conducted at 110–180 degrees centigrade for approximately 6 hours. Completeness in reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxyacetylated blown castor oil.

HYDROXYACETYLATED, BLOWN CASTOR OIL

Example 2

The same procedure is employed as in Example 1, preceding, except that twice the amount of hydroxyacetic acid is used.

HYDROXYACETYLATED, BLOWN CASTOR OIL

Example 3

The same procedure is followed as in Example 1, preceding, except that three times the amount of hydroxyacetic acid is employed so as to yield substantially a trihydroxyacetylated blown castor oil.

HYDROXYACETYLATED, BLOWN CASTOR OIL

Example 4

The same procedure is followed as in Examples 1 to 3, preceding, except that anhydrous hydroxyacetic acid is employed and water is removed immediately upon formation. The product so obtained represents hydroxyacetylated blown castor oil, or more especially, hydroxyacetylated blown triricinolein, in the presence of a minimum amount of hydroxyacetylated cogeners.

PREPARATION OF RAW MATERIAL, TYPE 3

*A hydroxyacetylated, drastically-oxidized, dehydrated ricinoleic acid compound*

The same sort of procedure which is used to oxidize ricinoleic acid compounds which have not been subjected to pyrolytic dehydration, such as ordinary castor oil of commerce, may also be employed to oxidize dehydrated castor oil, or similar material of the kind herein intended as a primary raw material. Generally speaking, however, the following modifications should be kept in mind:

Such materials are apt to contain at least a significant amount of octadecadiene 9,11-acid-1 or its ester, which is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. It is rarely necessary to oxidize at a temperature above 120° C. Thus, notwithstanding the fact that any of the usual procedures employed for oxidizing castor oil may be employed for oxidizing dehydrated castor oil, yet generally speaking, considerably less drastic conditions are required. Furthermore, the time element can be decreased greatly. The same sort of apparatus and the same sort of procedure is employed as in the case of conventional oxidation of castor oil. Since dehydrated castor oil is already polymerized to a greater or lesser degree, and perhaps has initial viscosity considerably greater than that of castor oil, it is obvious that the final stages of oxidation must be carried out more cautiously, and that excessive oxidation may produce a solid or spongy or rubber-like material without previous indication of the imminent critical stage. In any event, the material prior to oxidation should be analyzed and oxidation should be conducted until there is a significant change, as indicated by increase in viscosity, change in such indices as iodine number, hydroxyl number, etc., all of which is obvious to those skilled in the art. As a matter of fact, unless one desires to do so, there is no need to oxidize such dehydrated castor oil, insofar that various products of this kind are sold commercially and used in other arts which have no particular connection with the usage herein contemplated.

Castor oil or similar materials of the kind described have been dehydrated, and such dehydrated materials used for various other purposes, for instance, as substitutes for drying oils, as plasticizers in the manufacture of resins, as ingredients entering into the compounding of insulating materials, etc. Generally speaking, the conventional procedure is to subject a quantity of castor oil to destructive distillation, approximately 250°-310° C., and generally, 250°-285° C., until at least 5-15% of the original volume has been removed as a distillate. Sometimes the procedure is conducted primarily to recover the distillate, due to its high content of heptaldehyde. Generally speaking, the lower limits of the material distilled off are approximately 8-10%, and the upper limits, possibly 15-23%. In some instances, pyrolysis is conducted in the presence of an added catalyst, which may permit the reaction, i. e., the degradation or destructive distillation, to take place at lower temperature; and sometimes vacuum is employed or both vacuum and a catalyst. Such procedure of subjecting a ricinoleic acid compound, and especially ricinoleic acid or castor oil, to a pyrolysis, is so well known that no further elaboration is required. However, for convenience, reference is made to the following patents, which clearly describe the procedure, and in some instances, point out at least some of the complicated chemical changes that take place: U. S. Patents Nos. 1,240,565, Harris, Sept. 18, 1917; 1,749,463, Bertsch, Mar. 4, 1930; 1,799,420, Holton, Apr. 7, 1931; 1,886,538, Fanto, Nov. 8, 1932; 1,892,258, Ufer, Dec. 27, 1932; 2,156,737, Priester, May 2, 1939; 2,195,225, Priester, Mar. 26, 1940; and British Patent No. 306,452, Scheiber, May 9, 1930.

As to a comparative evaluation of various dehydration catalysts for castor oil, see Masloboino-Zhirovanya Prom. 16 No. 5/6, 33-8 (1940).

The products which we prefer to use as reactants in the present instance, are blown dehydrated castor oils having substantially the following identifying characteristics within the ranges indicated:

| | |
|---|---|
| Acid number | 14.0 to 25.0 |
| Saponification number | 195 to 240 |
| Iodine number | 70 to 95 |
| Hydroxyl number | 63.0 to 80.0 |
| Reichert-Meisel number | Less than 5 |
| Acetyl number | 60 to 75 |
| Percent unsaponifiable matter | Generally less than 3% |
| Percent nitrogen | 0.0% |
| Percent $SO_2$ | 0.0% |
| Percent ash | Trace |
| Specific gravity at 31° C. | About 0.9574 |
| Refractive index at 31° C. | About 1.495 |
| Color | Straw or light amber |

A specific example of a very desirable oxidized dehydrated castor oil for use in the practice of this invention and which is available in the open market, has approximately the following specific characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meisel number | 2.0 |
| Percent unsaponifiable matter | Less than 2.5% |
| Percent nitrogen | 0.0 |
| Percent $SO_2$ | 0.0 |
| Percent ash | Trace |
| Specific gravity at 31 deg. C. | 0.9574 |
| Refractive index at 31 deg. C. | 1.4795 |

The above values or similar values are of assistance in indicating and characterizing a material of the kind herein contemplated. For instance, although the entire chemistry of the dehydration of castor oil is not known, yet obviously, there must be a marked reduction in the acetyl or hydroxyl value, and simultaneously an increase in the iodine value. Also, such pyrolytic reaction tends to eliminate the low molal or volatile acids. On oxidation of such material, the acetyl value or hydroxyl value may stay constant or increase. But, in any event, the iodine value is reduced until it begins to approximate that of castor oil or ricinoleic acid prior to dehydration, or somewhat lower. The fact that the acetyl value or hydroxyl value does not increase proportionally with the drop in the iodine value is, of course, due to either the formation of ether type compounds, or oxides which do not give a hydroxyl or acetyl value, or else, due to the formation of ester acids or similar reactions. It is generally desirable that the iodine number of the drastically-oxidized dehydrated castor oil be not less than 70, that the saponification value be within the range 195 to 200, and that the acetyl value be within the range of 60 to 75.

The production of hydroxyacetylated, drastically-oxidized, dehydrated castor oil, or a similar type of compound, is comparatively simple and is comparable to the manufacture of acetylated castor oil, except that hydroxyacetic acid appears to be more reactive than acetic acid, and instead of using castor oil, one employs drastically-oxidized, dehydrated castor oil as a reactant. Since drastically-oxidized, dehydrated castor oil is characterized by the presence of a hydroxyl group or groups, as indicated by the hydroxyl value or number, it is obvious that esterification must take place, and thus the reactant is conducted in such a manner and under such conditions as to promote esterification and remove any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor and solvent vapor, is separated by gravity; and the solvent returned to the reacting chamber for further use.

The selection of suitable amounts of reactants in the manufacture of hydroxyacetylated, drastically-oxidized, dehydrated castor oil or the like, is, of course, simple. One may select a drastically-oxidized, dehydrated castor oil corresponding, for example, to the type previously described by analytical values. The hydroxyl or acetyl value or number includes the hydroxyl groups attached to each of the high molal acyl radicals present. The chemical changes occurring in the manufacture of drastically-oxidized, dehydrated castor oil indicate that the final product is, in essence, a glyceride, or at least, to the extent of a majority percentage. With this in mind, it is apparent that the hydroxyl groups may be distributed more or less uniformly in regard to the three high molal acyl radicals present in such glyceride. For convenience, in the present instance, one may consider such product as comparable to triricinolein, and as if it were a trihydric alcohol. From triricinolein one can obtain mono-hydroxyacetylated triricinolein, di-hydroxyacetylated triricinolein, and trihydroxyacetylated triricinolein. Similarly, based on molar proportions, one can obtain a mono-hydroxyacetylated, drastically-oxidized, dehydrated triricinolein, a di-hydroxyacetylated, drastically-oxidized, dehydrated triricinolein, and a tri-hydroxyacetylated, drastically-oxidized, dehydrated triricinolein. For practical purposes, of course, there is no economical justification for obtaining a technically pure triricinolein, subjecting such material to dehydration, and then to drastic oxidation, and finally to hydroxyacetylation. For practical purposes, we prefer to use castor oil as the initial raw material. Actually, one is not limited to the stoichiometric proportions, for we have found that a moderate excess of hydroxyacetic acid may be employed, over and above the amount indicated by the acetyl number or value.

Thus, the product particularly contemplated in the present instance, is the compound or compounds obtained by the hydroxyacetylation of drastically-oxidized, dehydrated castor oil. For purposes of convenience, reference will be made to mono-hydroxyacetylated, drastically-oxidized dehydrated castor oil, di-hydroxyacetylated, drastically-oxidized, dehydrated castor oil, and tri-hydroxyacetylated, drastically-oxidized, dehydrated castor oil. Examination of the reaction indicates that water is formed and must be removed. Actually, the water formed may not necessarily be removed instantly, and thus, may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reactions with the drastically-oxidized, dehydrated castor oil, and thus, the product or composition which is actually hydroxyacetylated may include the estolides. (See U. S. Patent No. 2,262,743, dated November 11, 1941, to De Groote and Keiser), and also lower glycerides of the drastically-oxidized, dehydrated castor oil. Glycerol may also be present, but it is not intended in the present instance to claim the product obtained or reaction between hydroxyacetic acid and glycerol, but it is to be noted that such material may be present cogenerically, for reasons indicated.

The lower-glycerides are comparable to mono-olein or di-olein, and are referred to generically as superglycerinated fats, or more specifically, superglycerinated tri-ricinolein, or superglycerinated castor oil. In the present instance, the proper nomenclature would be superglycerinated, drastically-oxidized, dehydrated castor oil. Actually, if one desired, such products or compounds need not be obtained by hydrolysis, but one could treat one mole of drastically-oxidized, dehydrated castor oil with one or two moles of glycerol in the customary manner, so as to cause rearrangement to take place, i. e., so as to obtain the lower glycerides.

Earlier reference to the compounds herein contemplated, and particularly for use as a demulsifier, included the hydroxyacetylated derivatives of drastically-oxidized, dehydrated ricinoleic acid compounds. In view of what has been said, such compounds are now suitably limited to drastically-oxidized, dehydrated castor oil, drastically-oxidized, dehydrated triricinolein, drastically-oxidized, dehydrated diricinolein, drastically-oxidized, dehydrated monoricinolein, and the estolides of drastically-oxidized, dehydrated castor oil, together with drastically-oxidized, dehydrated ricinoleic acid and polyricinoleic acid.

Although it is believed that in view of what has been said, that no further description is necessary in regard to the manufacture of hydroxyacetylated, drastically-oxidized, dehydrated castor oil, or similar compounds, the following examples are included by way of illustration:

HYDROXYACETYLATED, DRASTICALLY-OXIDIZED, DEHYDRATED CASTOR OIL

*Example 1*

1,000 pounds of drastically-oxidized, dehydrated castor oil, comparable in chemical characteristics to the tabular specification appearing previously, is treated with 37 pounds of concentrated hydroxyacetic acid containing 30% of water. The selected amount is sufficient to combine with one-third of the available hydroxyl radicals, as indicated by the acetyl value or number. The reaction is conducted at 110–180 degrees centigrade for approximately 6 hours. Completeness in reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxyacetylated, blown, dehydrated castor oil.

HYDROXYACETYLATED, DRASTICALLY-OXIDIZED, DEHYDRATED CASTOR OIL

Example 2

The same procedure is employed as in Example 1, preceding, except that twice the amount of hydroxyacetic acid is employed so as to obtain a dihydroxyacetylated, blown, dehydrated castor oil.

HYDROXYACETYLATED, DRASTICALLY-OXIDIZED, DEHYDRATED CASTOR OIL

Example 3

The same procedure is followed as in Example 1, preceding, except that three times the amount of hydroxyacetylated castor oil is employed so as to yield substantially a tri-hydroxyacetylated, blown, dehydrated castor oil.

HYDROXYACETYLATED, DRASTICALLY-OXIDIZED, DEHYDRATED CASTOR OIL

Example 4

The same procedure is followed as in Examples 1 to 3, preceding, except that anhydrous hydroxyacetic acid is employed and water is removed immediately upon formation. The product so obtained represents hydroxyacetylated, blown, dehydrated castor oil, or more especially, hydroxyacetylated, blown, dehydrated triricinolein, in the presence of a minimum amount of hydroxyacetylated cogeners.

HYDROXYACETYLATED, DRASTICALLY-OXIDIZED, DEHYDRATED CASTOR OIL

Example 5

The same procedure is followed as in Examples 1 to 4, preceding, but instead of using the stoichiometric amount of hydroxyacetic acid to yield a completely hydroxyacetylated product, one employs an excess, for instance, a 10–20% excess of hydroxyacetic acid.

Nothing that has been said previously is intended to suggest that one cannot use chemically pure or technically pure triricinolein as an initial raw material instead of castor oil. Furthermore, one may obtain or prepare diricinolein, either pure or of a technical purity, and such material may be employed as an initial raw material. Likewise, pure or technically pure monoricinolein or ricinoleic acid may be employed. For obvious reasons, however, nothing is ordinarily gained by using any initial raw material other than castor oil, and we have found castor oil to yield much more effective demulsifiers than the other materials referred to. Thus, our preference, by far, is to employ castor oil as the initial raw material, and to subject it to drastic oxidation and dehydration.

Having obtained suitable raw materials of the kind previously described, the next and final step is reaction with a polybasic carboxy acid, or its functional equivalent, such as the anhydride. Since compounds of the kind previously described invariably have an alcoholiform hydroxyl radical present, reaction with a polybasic acid or anhydride is simply an esterification reaction. The amount of polybasic carboxy acid or anhydride empolyed is a stoichiometrical equivalent to the hydroxyl groups present or a fraction thereof. This can be illustrated readily by reference to triricinolein, which may be considered as a polyhydric alcohol.

Thus triricinolein may combine with one part, two parts, or three parts of a polybasic acid, such as phthalic acid, maleic acid, etc. In the present instance, one employs an amount of polybasic acid which is sufficient to convert completely the raw material considered as an alcohol into the corresponding ester or some fraction of such stoichiometrical amount, as, for example, one-third or one-half such an amount. The method of esterification is relatively simple, and is the same procedure ordinarily employed for the esterification of similar alcohols, and particularly, for the esterification of such alcohols with acids, such as ricinoleic acid, phthalic acid, maleic acid, succinic acid, or the like. This can be accomplished in a number of ways. For instance, the reactants may be heated to a fairly high temperature, provided the polybasic acid does not decompose, as, for example, a temperature of 160–180° C. Any water which is formed in rapidly eliminated. Constant stirring is employed during the entire process, and particularly to prevent local overheating.

A second procedure involves passing a dried inert gas such as nitrogen through the reaction mass to hasten reaction and to help eliminate any water which may be formed.

Another procedure is to add a small portion of a sulfonic acid, for instance, half a percent of benzene sulfonic acid or the like, to serve as a catalyst and hasten reaction.

Still another procedure is to add an insoluble high boiling inert solvent to the reaction mass and permit such solvent to reflux under conditions which help eliminate any water vapor, which may be removed after condensation. A condensed solvent is returned to the reaction chamber and may be removed after reaction is complete, or may be allowed to remain as a solvent in the final mass.

COMPOSITION OF MATTER

Example 1

A drastically-oxidized, hydroxyacetylated castor oil of the kind described under a previous sub-heading entitled "Drastically-oxidized, hydroxyacetylated castor oil, Example 1" is analyzed to determine the acetyl or hydroxyl value. 1,000 lbs. of such material are then reacted with a suitable selected quantity of phthalic anhydride; for instance, 350 lbs. of phthalic anhydride will serve conveniently. The reaction is conducted in a reaction chamber at approximately 150–180 degrees for 4–10 hours. The reaction mass may be diluted with a suitable solvent while still warm, and is particularly effective as a demulsifier.

COMPOSITION OF MATTER

Example 2

The same procedure is followed as in Example 1, preceding except that one employs instead of the material described under the sub-heading "Drastically-oxidized, hydroxyacetylated castor oil, Example 1," the particular varieties described under the same heading, but identified by "Example 2," "Example 3," or "Example 4."

COMPOSITION OF MATTER

*Example 3*

The same procedure is followed as in Examples 1 and 2, preceding except that one or more of the various hydroxyacetylated, blown castor oils described under the sub-headings "Hydroxyacetylated, blown castor oil, Examples 1, 2, 3, and 4," are substituted for 1,000 lbs. of ricinoleic acid compounds used in the two examples preceding as raw materials.

COMPOSITION OF MATTER

*Example 4*

The same procedure is followed as in Composition of Matter, Examples 1 and 2, preceding, except that one or more of the various hydroxyacetylated, blown castor oils dscribed under the sub-headings "Hydroxyactelyated, drastically-oxidized, dehydrated castor oil, Examples 1-5," is substituted for the 1,000 lbs. of ricinoleic acid compounds used in the Examples 1 and 2, preceding, as raw materials.

COMPOSITION OF MATTER

*Example 5*

The same procedure is followed as in Examples 1-4, preceding, except that maleic anhydride is substituted for phthalic anhydride.

COMPOSITION OF MATTER

*Example 6*

The same procedure is followed as in Examples 1-4, preceding, except that citraconic anhydride is substituted for phthalic anhydride.

Previous reference has been made to the fact that the raw materials employed in the present instance for reaction with polybasic acids may be considered in their simplest forms as alcohols, including polyhydric alcohols. Similarly, at least part of the products derived may be considered as fractional esters; and one type of fractional ester is characterized by the presence of one or more free carboxyl groups, and particularly derived from the polybasic carboxy acid.

As far as demulsification is concerned, we prefer to use the acidic type of fractional ester. Such type is readily prepared by using the properly selected, predetermined amount of polybasic carboxy acid or anhydride. The presence of the acidic group or groups is indicated by an acid value determination on the finished product.

Conventional demulsifying agents employed in the treatment of oil field emulsions are used as such, or after dilution with any suitable solvent, such as water, petroleum hydrocarbons, such as gasoline kerosene stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

In practising our process, a treating agent or demulsifier of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The materials or compounds herein described form the subject-matter of our co-pending application Serial No. 493,160, filed July 1, 1943, which is a continuation, in part, of the present application.

Having thus described our invention, what we claim as new and desire to secure by Letters Patent is:

1. A process for breaking petroleum emulsions of the water-in-oil type, characterized by subjecting the emulsion to the action of an ester derived by reaction between a reactive polybasic carboxy acid compound and a member of the class consisting of a drastically-oxidized, hydroxyacetylated ricinoleic acid compound, a hydroxyacetylated, drastically-oxidized ricinoleic acid compound, and a hydroxyacetylated, drastically-oxidized, dehydrated ricinoleic acid compound.

2. A process for breaking petroleum emulsions of the water-in-oil type, characterized by subjecting the emulsion to the action of an ester derived by reaction between a reactive dibasic carboxy acid compound and a member of the class consisting of a drastically-oxidized, hydroxyacetylated ricinoleic acid compound, a hydroxyacetylated, drastically-oxidized ricinoleic acid compound, and a hydroxyacetylated, drastically-oxidized dehydrated ricinoleic acid compound.

3. A process for breaking petroleum emulsions of the water-in-oil type, characterized by subjecting the emulsion to the action of an ester derived by reaction between a reactive dibasic carboxy acid compound having less than 9 carbon atoms, and a member of the class consisting of a drastically-oxidized, hydroxyacetylated ricinoleic acid compound, a hydroxyacetylated, drastically-oxidized ricinoleic acid compound, and a hydroxyacetylated, drastically-oxidized dehydrated ricinoleic acid compound.

4. A process for breaking petroleum emulsions of the water-in-oil type, characterized by subjecting the emulsion to the action of an ester derived by reaction between a reactive dibasic carboxy acid compound having less than 9 carbon atoms, and a drastically-oxidized, hydroxyacetylated ricinoleic acid compound.

5. A process for breaking petroleum emulsions of the water-in-oil type, characterized by subjecting the emulsion to the action of an ester derived by reaction between a reactive dibasic carboxy acid compound having less than 9 carbon atoms, and a hydroxyacetylated, drastically-oxidized ricinoleic acid compound.

6. A process for breaking petroleum emulsions of the water-in-oil type, characterized by subjecting the emulsion to the action of an ester derived by reaction between a reactive dibasic carboxy acid compound having less than 9 carbon atoms, and a hydroxyacetylated, drastically-oxidized, dehydrated ricinoleic acid compound.

MELVIN DE GROOTE.
BERNHARD KEISER.
ARTHUR F. WIRTEL.